United States Patent
Perkins

(10) Patent No.: US 7,871,348 B2
(45) Date of Patent: Jan. 18, 2011

(54) VEHICLE HYBRID POWERTRAIN SYSTEM AND METHOD OF OPERATING SAME

(75) Inventor: William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 12/017,138

(22) Filed: Jan. 21, 2008

(65) Prior Publication Data

US 2009/0186734 A1    Jul. 23, 2009

(51) Int. Cl.
    *F16H 3/72* (2006.01)
(52) U.S. Cl. ............................................. 475/5; 475/84
(58) Field of Classification Search ...... 475/5, 475/84, 150; 477/3
    See application file for complete search history.

(56) References Cited

U.S. PATENT DOCUMENTS

| | | | |
|---|---|---|---|
| 5,017,183 A | 5/1991 | Teraka | |
| 5,511,448 A | 4/1996 | Kameda et al. | |
| 5,989,146 A | 11/1999 | Brown et al. | |
| 6,371,878 B1 * | 4/2002 | Bowen | 475/5 |
| 6,428,438 B1 * | 8/2002 | Bowen | 475/5 |
| 6,490,945 B2 | 12/2002 | Bowen | |
| 6,896,635 B2 | 5/2005 | Tumback | |
| 7,125,357 B2 | 10/2006 | Porter | |
| 7,137,920 B2 | 11/2006 | Olsson | |
| 2002/0045507 A1 * | 4/2002 | Bowen | 475/5 |
| 2009/0321157 A1 * | 12/2009 | Sowul et al. | 180/65.22 |

* cited by examiner

*Primary Examiner*—Ha D. Ho
(74) *Attorney, Agent, or Firm*—David B. Kelley; Brooks Kushman P.C.

(57) ABSTRACT

A torque-producing machine and planetary gear set biases torque between primary and secondary drivelines of a vehicle. A first element of the planetary gear set is connected to an upstream torque source. A second element of the planetary gear set is connected to the secondary driveline. A third element of the planetary gear set is connected to a torque-producing biasing machine.

20 Claims, 15 Drawing Sheets

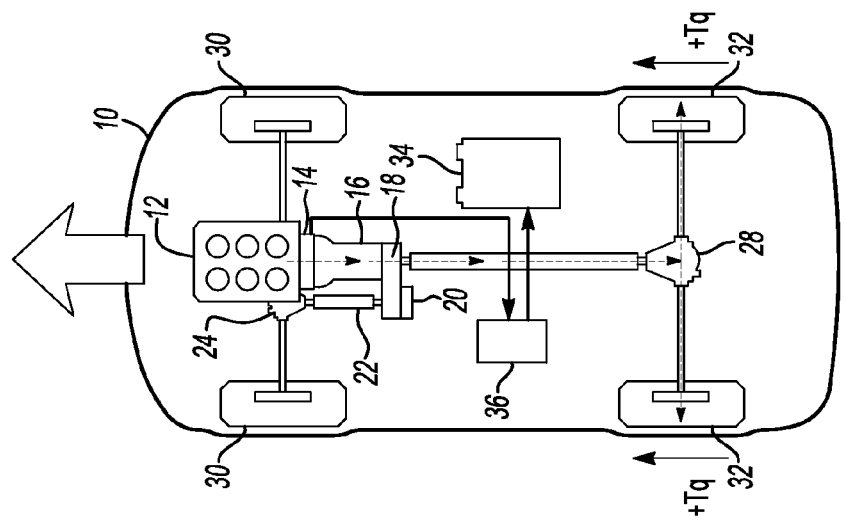
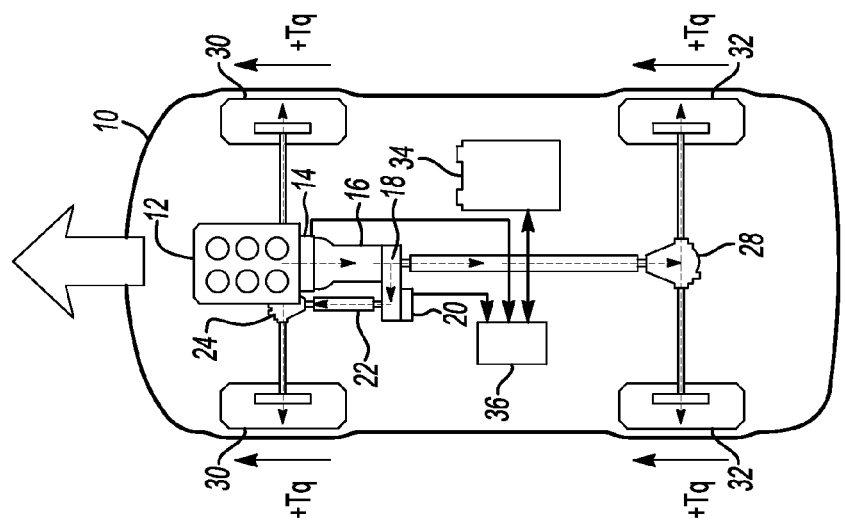
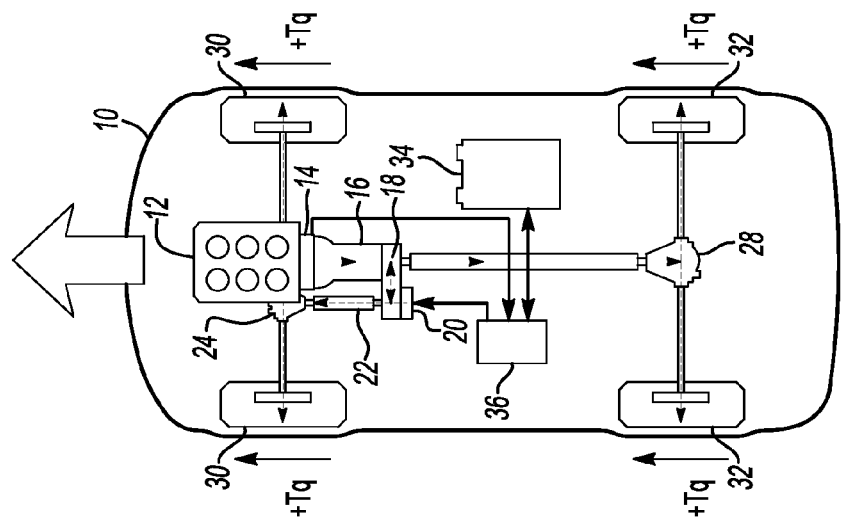

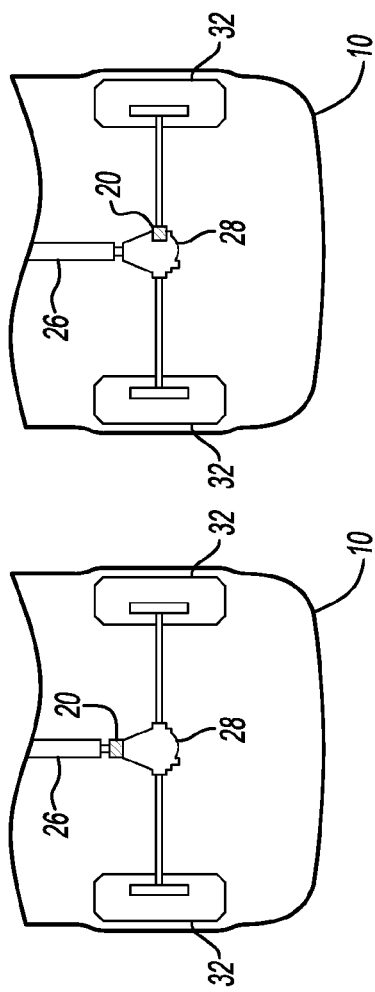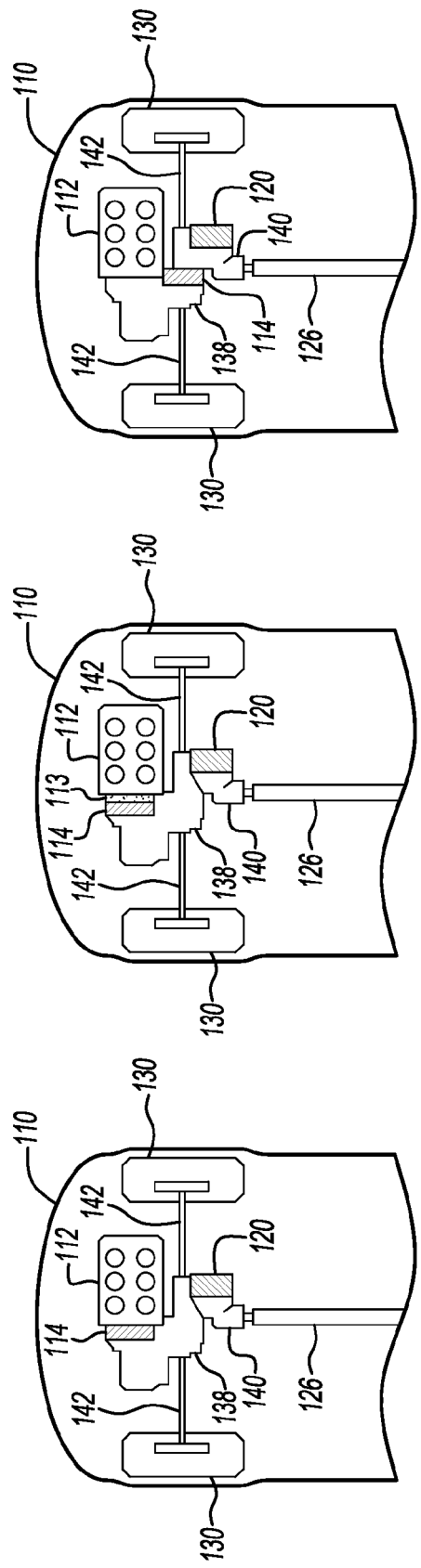

VEHICLE HYBRID POWERTRAIN SYSTEM AND METHOD OF OPERATING SAME

BACKGROUND

1. Field of the Invention

The invention relates to vehicle hybrid powertrain systems and methods of operating the same.

2. Discussion

Hybrid powertrain systems generally increase fuel economy. Conventional actively managed 4 WD systems generally increase stability and tractive performance. Including both systems in a single vehicle, however, may present cost, packaging and complexity issues.

SUMMARY

A vehicle hybrid powertrain system may include a power transfer box and first and second electric machines. The power transfer box transfers mechanical power between primary and secondary drivelines. The first electric machine selectively provides motive power to at least one of the drivelines, receives motive power from at least one of the drivelines or free spins. The second electric machine likewise selectively provides motive power to at least one of the drivelines, receives motive power from at least one of the drivelines or free spins.

BRIEF DESCRIPTION OF DRAWINGS

FIGS. 11A-11B are schematic diagrams of exemplary motor locations for alternatively powered vehicles with north-south powertrain configurations.

FIGS. 12A-12C are schematic diagrams of exemplary motor locations for alternatively powered vehicles with east-west powertrain configurations.

DETAILED DESCRIPTION

Figures 1, 2:
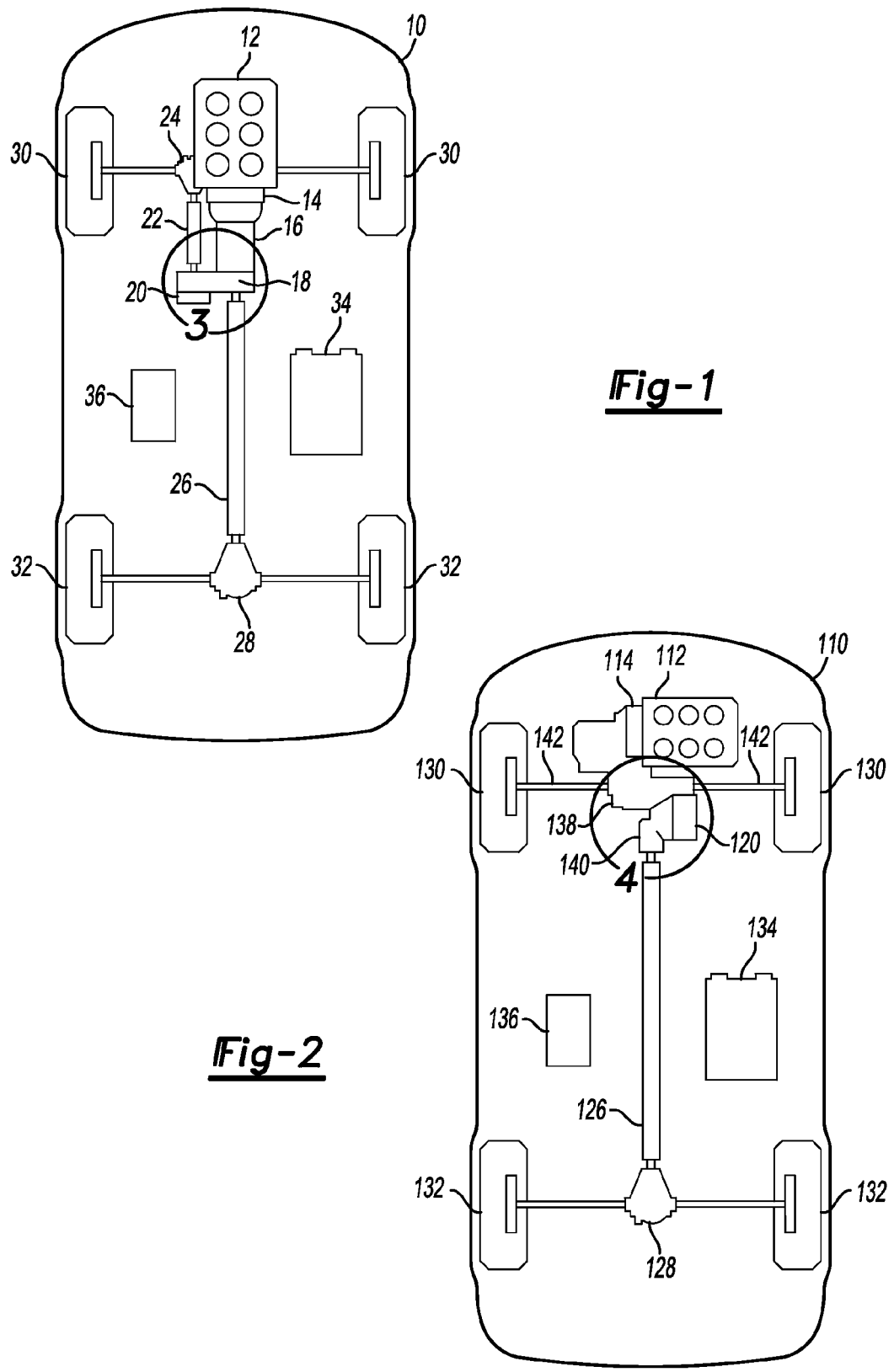
FIG. 1 is schematic diagram of an exemplary alternatively powered vehicle with a north-south powertrain configuration in accordance with certain embodiments of the invention.
FIG. 2 is a schematic diagram of an exemplary alternatively powered vehicle with an east-west powertrain configuration in accordance with certain embodiments of the invention.

Hybrid components may provide active 4 WD torque-biasing. For example, a torque-producing machine in conjunction with a planetary gear set biases torque between a vehicle's primary and secondary drivelines. An element of the planetary gear set may be connected to an upstream torque source, e.g., an IC engine and/or other torque-producing machine, another element may be connected to the secondary driveline, and a third element may be connected to a torque-producing biasing machine, e.g., a biasing motor.

During 2 WD operation, an engine sends torque to the primary driveline with no contribution from the biasing motor. To enable 4 WD, the biasing motor applies torque to one element of the planetary gear set while the engine applies torque to another element of the planetary gear set. Torque is transmitted to the secondary driveline via a third element of the planetary gear set.

In addition to the engine and biasing motor, another torque-producing machine may be placed in the powertrain/driveline. This torque-producing machine, e.g., counter motor, converts energy to/from shaft power.

A storage device may be included to store energy that has been converted from shaft power by the biasing motor and counter motor.

In an exemplary 2 WD propulsion scenario, the engine transmits torque to the primary driveline, and the counter motor may: (1) assist the engine by converting energy from the storage device to shaft power, (2) convert a portion of engine torque to energy and send it to the storage device or other electrical devices, such as the biasing motor, or (3) remain inactive. Alternatively, the engine may be turned off, allowing the counter motor alone to send torque to the primary driveline.

In an exemplary 4 WD propulsion scenario, the engine and counter motor transmit torque to the primary driveline and to the secondary driveline via the biasing motor. The biasing motor may apply torque to the planetary gear set in two ways: (1) by converting storable energy to shaft power (motoring), or (2) by converting shaft power to storable energy (generating). Torque is produced that reacts to the engine and counter motor torque and consequently facilitates torque transfer to the secondary driveline.

In case 1, the biasing motor may receive the storable energy from the storage device, from the counter motor or from both. In case 2, the biasing motor may send the storable energy to the storage device, to the counter motor or to both. Alternatively, the engine may be turned off and the biasing motor may: (1) independently drive the primary and secondary drivelines without contribution from the counter motor, or (2) cooperatively drive the primary and secondary drivelines with contribution from the counter motor. The amount of biasing motor participation relative to the engine and counter motor contribution determines the amount of torque-biasing between the primary driveline and secondary driveline. Brake-based torque-biasing may also be used to bias torque between the primary and secondary drivelines.

In deceleration scenarios, any of the components may be used to slow the vehicle. For example, (1) the engine alone may retard the vehicle through compression braking, (2) the counter motor may slow the vehicle by converting kinetic energy to storable energy, (3) the biasing motor may slow the vehicle by converting kinetic energy to storable energy, (4) the foundation brakes may be used to slow the vehicle, or 5) any combination of 1-4.

Energy collected during regenerative braking may be stored in the storage device for later usage. The biasing motor, in cooperation with the counter motor, may be used to bias the amount of regenerative braking between the primary and secondary drivelines. This allows the vehicle controller to maintain vehicle stability while also maximizing regenerative braking in mild to aggressive braking situations.

The engine may be a gasoline, diesel or other type of internal combustion engine. The engine may also be absent, with only the crank motor or other type of torque source used. The biasing motor and counter motor may be electric, hydraulic or other type of motor. Electric motors and batteries may be replaced with analogous components, such as hydraulic motors and accumulators.

The placement of the engine and motors in the powertrain/driveline may vary. The counter motor may be placed anywhere between the engine and the front and rear differentials. The biasing motor may be placed anywhere between the junction of the primary and secondary drivelines and the front and rear differentials. For example, if one biasing motor is used, the biasing motor may be placed in the driveline anywhere between the junction of the primary and secondary drivelines and the front and rear differentials. If two or more biasing motors are used, the biasing motors may be placed in the driveline anywhere between the junction of the primary and secondary drivelines and the wheels. If one counter motor is used, the counter motor may be placed in the driveline anywhere between the engine and the front and rear differentials. If two or more counter motors are used, the counter motors may be placed in the driveline anywhere between the engine and the wheels.

The final drive ratio of the secondary driveline may be varied to offset the ratio of the planetary gear set connected to the biasing motor. This may reduce the parasitic drag of the biasing motor. For example, if the secondary driveline ratio is X and the planetary gear set ratio is 1/X, then the speed of the input shaft to the planetary gear set is exactly offset by the speed of the output shaft. Consequently, the biasing motor does not spin. If the secondary driveline ratio is X and the planetary gear set ratio is 1/Y, then the biasing motor may spin at a speed proportional to the difference between X and Y. The ability to control the biasing motor speed through ratio balancing provides significant freedom in designing the biasing motor, as well as the counter motor and other system components. Further, the biasing motor gear ratio may be selected to optimize the torque split between primary and secondary drivelines for propulsion and regenerative braking.

Disconnect clutches may be used to disconnect powertrain/driveline components as needed. As an example, in a vehicle with the counter motor attached to the engine crankshaft, e.g., a crank-motor, the transmission may be put in neutral to disconnect the engine and crank-motor from the driveline. The biasing motor alone propels the vehicle. While disconnected, the engine may also drive the crank-motor to generate energy for storage or for use by the biasing motor. As another example, a clutch between the engine and crank-motor may disconnect the engine from the driveline. The crank-motor alone propels the vehicle or cooperatively propels the vehicle with assistance from the biasing motor. Other clutch configurations are also possible, including motor disconnects and wheel-end disconnects.

FIG. 1 is a schematic diagram of an alternatively powered vehicle 10, e.g., hybrid electric vehicle. The vehicle 10 includes an engine 12, crank motor 14, transmission 16, transfer case 18 and biasing motor 20, e.g., permanent magnet motor. The vehicle 10 also includes a front prop shaft 22, front axle assembly 24, rear prop shaft 26 and rear axle assembly 28. The vehicle 10 further includes front wheel and tire assemblies 30, rear wheel and tire assemblies 32, a battery 34, e.g., high voltage battery, low voltage battery, etc., and controllers and power electronics 36, e.g., vehicle systems controller, battery control unit, intelligent circuits, power converters, etc.

As discussed below, components shown adjacent to one another are mechanically coupled. As an example, the engine 12 is mechanically coupled with the crank motor 14. As another example, the transfer case 18 is mechanically coupled with the transmission 16, biasing motor 20 and front prop shaft 22, etc.

FIG. 2 is a schematic diagram of an alternatively powered vehicle 110, e.g., hybrid electric vehicle. Numbered elements differing by 100 may have similar descriptions, e.g., engines 12, 112. The vehicle 110 includes an engine 112, counter motor 114, transaxle 138, power transfer unit 140 and biasing motor 120. The vehicle 110 also includes front half-shafts 142, rear prop shaft 126 and rear axle assembly 128. The vehicle 110 further includes front wheel and tire assemblies 130, rear wheel and tire assemblies 132, a high voltage battery 134 and controllers and power electronics 136.

As discussed below, components shown adjacent to one another are mechanically coupled. As an example, the power transfer unit 140 is mechanically coupled with the transaxle 138, biasing motor 120 and rear prop shaft 126. As another example, the crank motor 114 is mechanically coupled with the transaxle 138, etc.

Figure 3A:
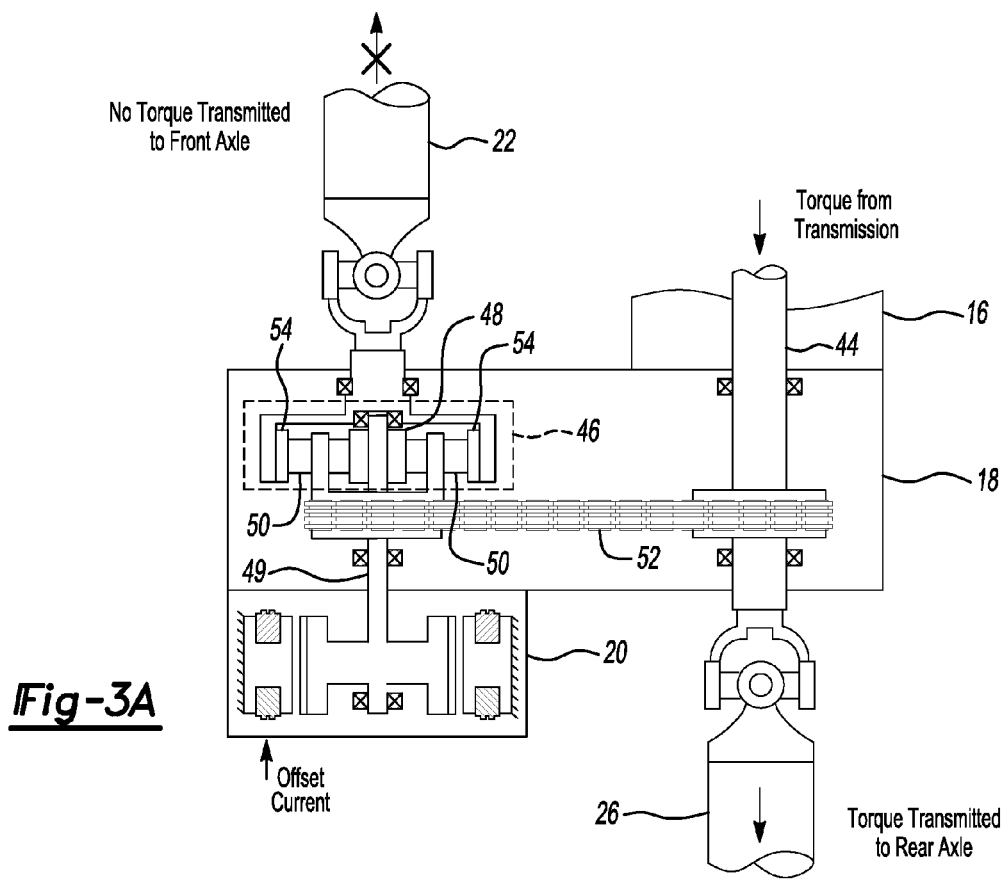
FIGS. 3A-3B are schematic diagrams of the transfer case and biasing motor of FIG. 1 taken about line 3 of FIG. 1.

FIG. 3A is a schematic diagram of a portion of the vehicle 10 taken about line 3 of FIG. 1. In the example of FIG. 3A, torque from the transmission 16 is transmitted to the rear prop shaft 26 but not to the front prop shaft 22. Torque from the transmission 16 is transmitted to the rear prop shaft 26 via the torque shaft 44.

Planetary gear set 46 includes a sun gear 48 mechanically coupled with a biasing motor 20 via a shaft 49, planet gears 50 mechanically coupled with the torque shaft 44 via a flexible link 52, e.g., chain, and a ring gear 54 mechanically coupled with the front prop shaft 22. Offset power from the high voltage battery 34 (FIG. 1) is supplied, if required, to the biasing motor 20. As a result, the planetary gear set 46 rotates such that torque from the torque shaft 44 is not transmitted to the front prop shaft 22 via the flexible link 52.

Figure 3B:
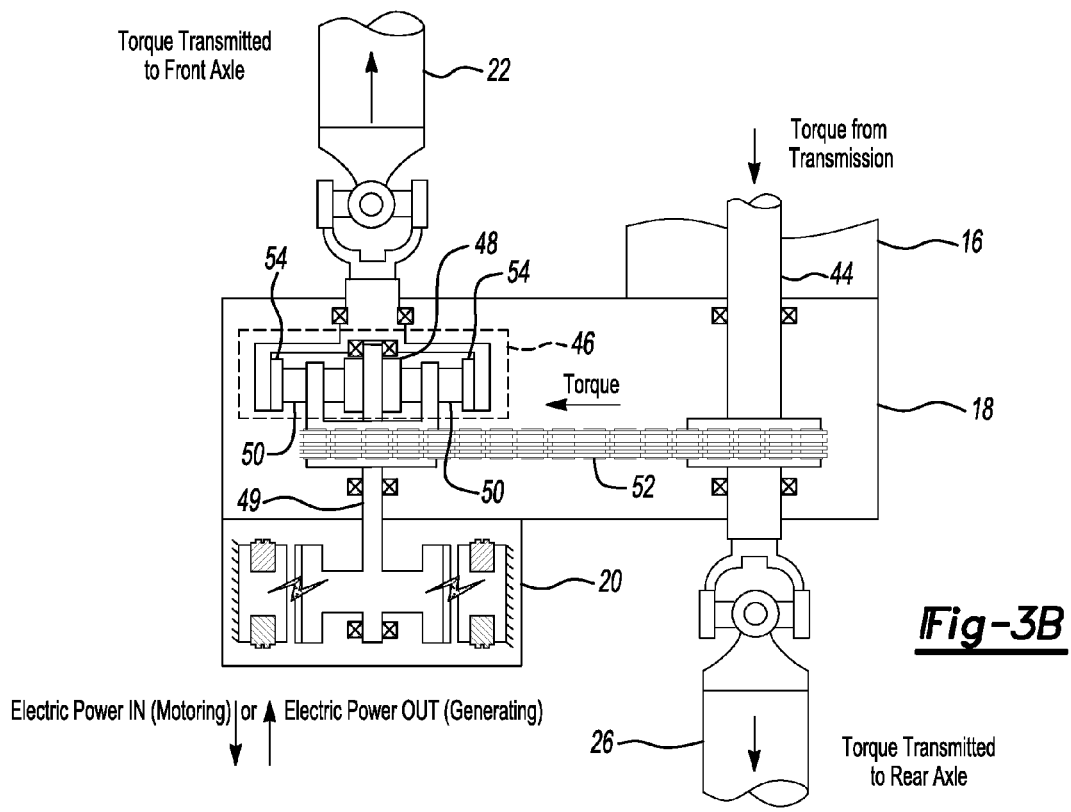

FIG. 3B is another schematic diagram of a portion of the vehicle 10 taken about line 3 of FIG. 1. In the example of FIG. 3B, torque from the transmission 16 is transmitted to the rear prop shaft 26 and front prop shaft 22. The biasing motor 20 applies torque to the sun gear 48 by either receiving power (motoring) from the high voltage battery 34 (FIG. 1) or sending power (generating) to the high voltage battery 34. The torque from the sun gear 48 opposes torque from the planet gears 50. The planet gears 50 thus drive the ring gear 54 which transmits torque to the front prop shaft 22.

Figure 4A:
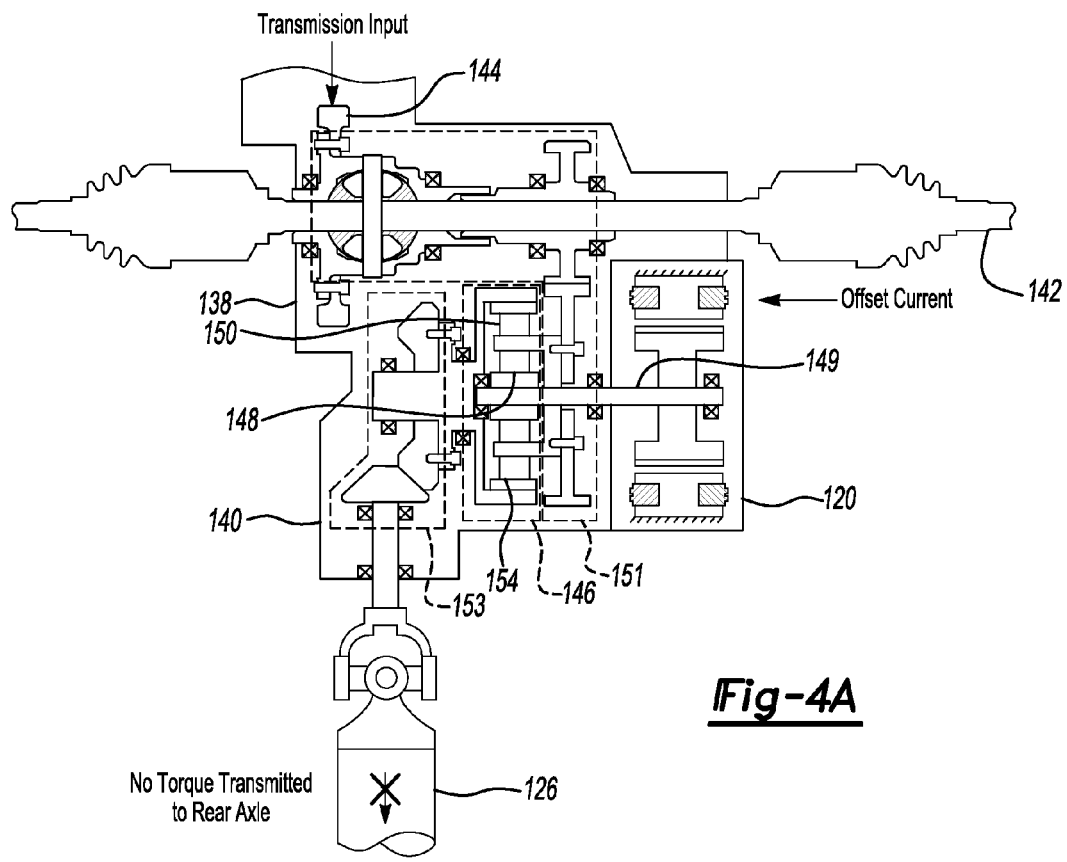
FIGS. 4A-4B are schematic diagrams of the power transfer unit assembly and biasing motor of FIG. 2 taken about line 4 of FIG. 2.

FIG. 4A is a schematic diagram of a portion of the vehicle 110 taken about line 4 of FIG. 2. In the example of FIG. 4A, torque from the transaxle 138 is transmitted to the front half-shafts 142 but not to the rear prop shaft 126.

Planetary gear set 146 includes a sun gear 148 mechanically coupled with a biasing motor 120 via a shaft 149, planet gears 150 mechanically coupled with a torque shaft 144 via a gear set 151, and a ring gear 154 mechanically coupled with a rear prop shaft 26 via a gear set 153. Offset power from the high voltage battery 134 (FIG. 2) is supplied, if required, to the biasing motor 120. As a result, the planetary gear set 146 rotates such that torque from the torque shaft 144 is not transmitted to the rear prop shaft 126.

Figure 4B:
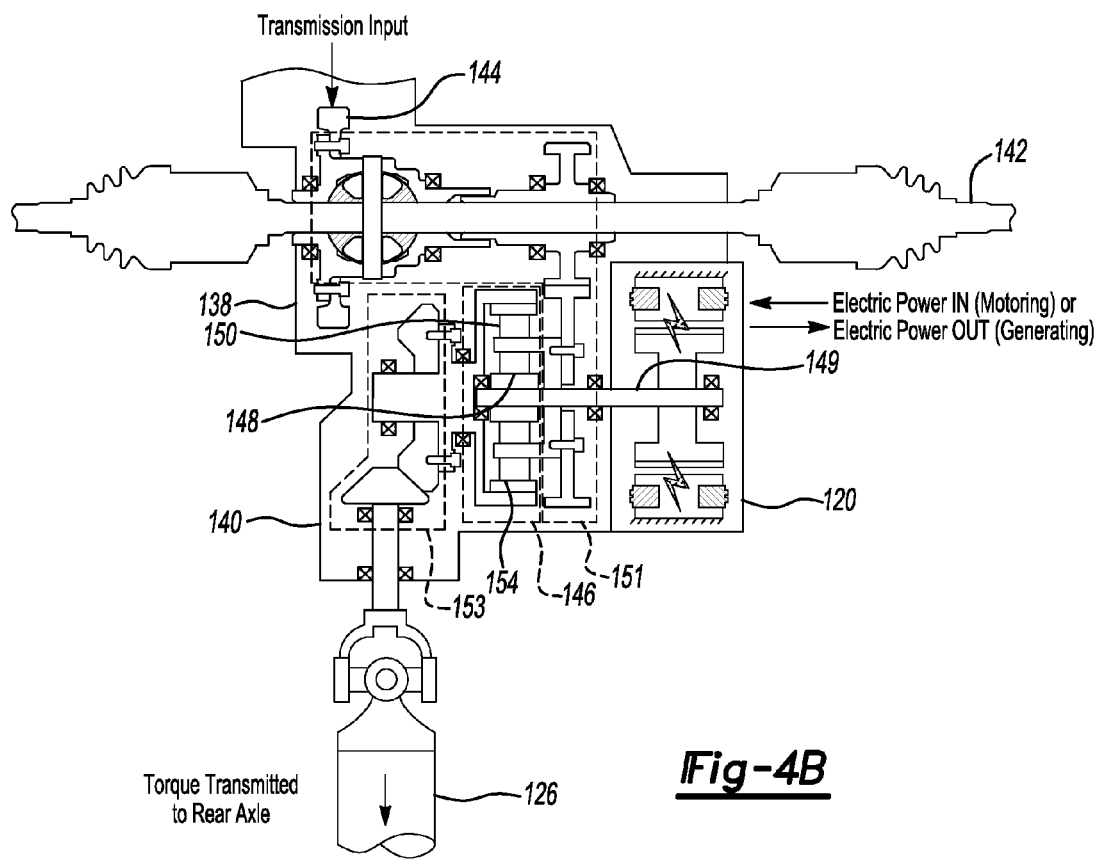

FIG. 4B is another schematic diagram of a portion of the vehicle 110 taken about line 4 of FIG. 2. In the example of FIG. 4B, torque from a transaxle 148 is transmitted to the front half-shafts 142 and the rear prop shaft 126. The biasing motor 120 applies torque to the sun gear 148 by either receiving power (motoring) from the high voltage battery 134 (FIG. 2) or sending power (generating) to the high voltage battery 134. The torque from the sun gear 148 opposes torque from the planet gears 150. The planet gears 150 thus drive the ring gear 154 which transmits torque to the rear prop shaft 126.

Figure 5C:
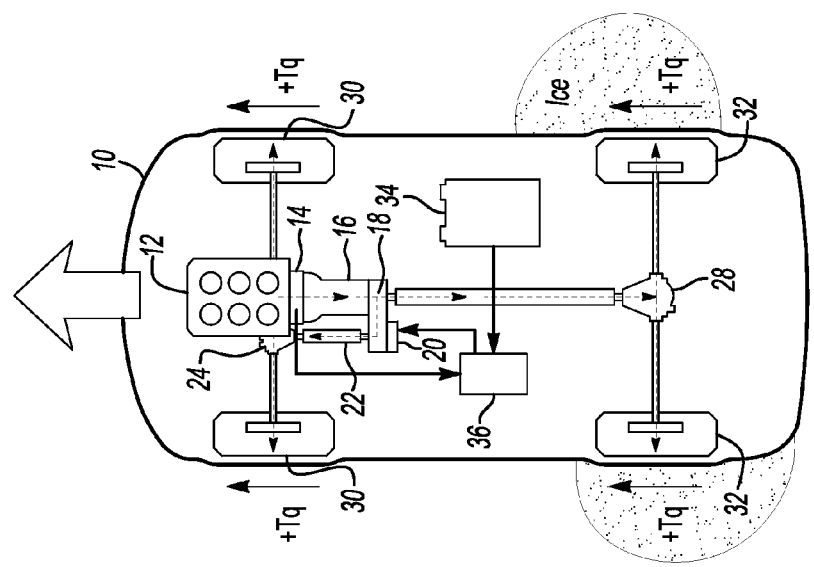
FIGS. 5A-5C are schematic diagrams of exemplary split-μ operations of the alternatively powered vehicle of FIG. 1.
Figure 5B:
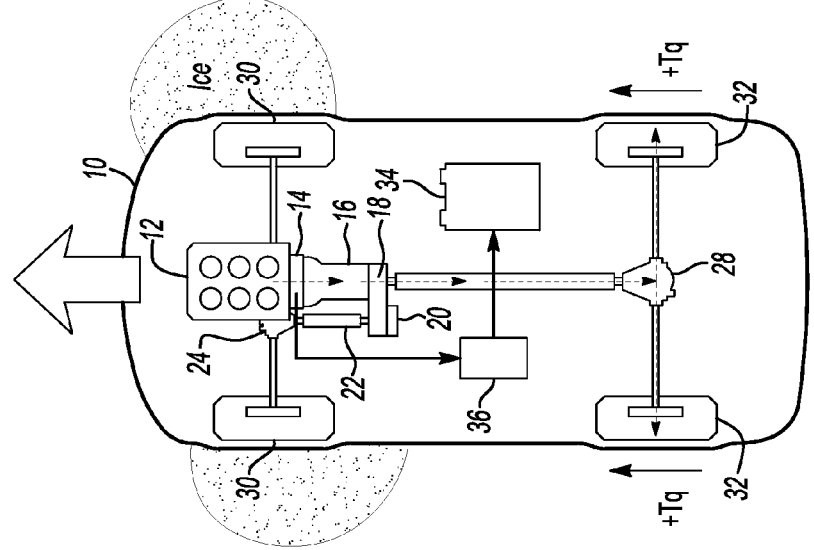
Figure 5A:
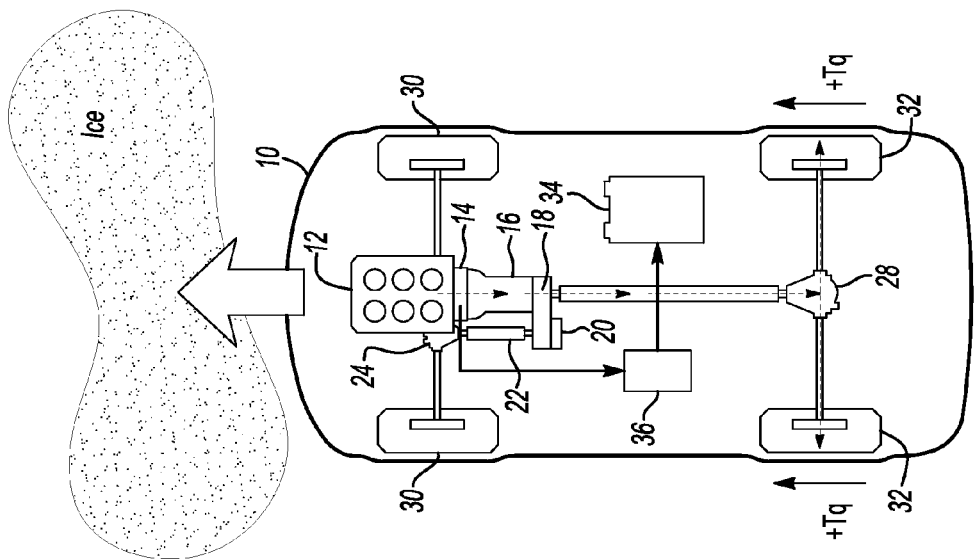

FIGS. 5A-5C are schematic diagrams of exemplary split-μ operations of the alternatively powered vehicle of FIG. 1. As the vehicle 10 in FIG. 5A approaches a patch of ice, torque is delivered from the engine 12 and the crank motor 14 to the rear axle assembly 28. Solid arrowed lines indicate the flow of electrical power. Dashed arrowed lines indicate the flow of mechanical power.

The ice patch is under the front wheel and tire assemblies 30 in FIG. 5B potentially affecting steering but not propulsion. Torque is still delivered from the engine 12 and crank motor 14 to the rear axle assembly 28. If the crank motor 14 is not used for propulsion, it may convert some engine torque to storable energy.

The ice patch is under the rear wheel and tire assemblies 32 in FIG. 5C affecting propulsion. The biasing motor 20 is enabled, allowing torque transfer from the engine 12 and crank motor 14 to the front axle assembly 24. If the crank motor 14 is not used for propulsion, it may convert some engine torque to storable energy.

Figure 6A:
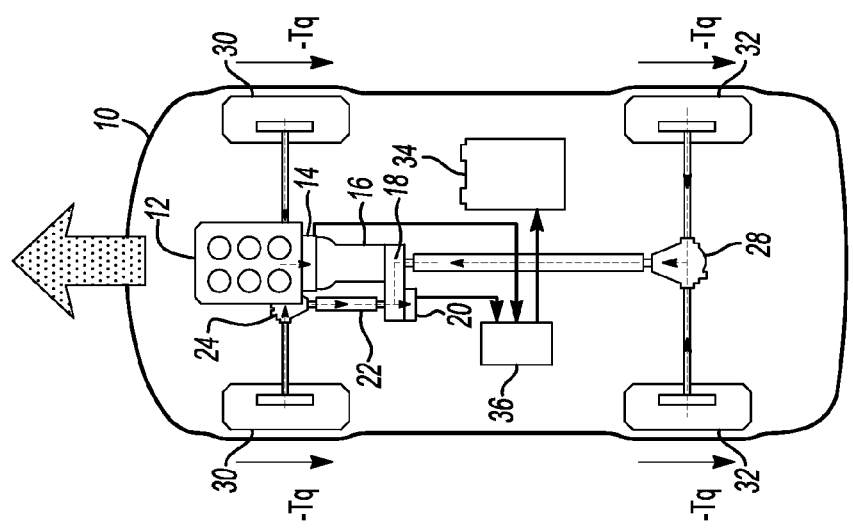
FIGS. 6A-6E are schematic diagrams of exemplary regenerative braking operations of the alternatively powered vehicle of FIG. 1.

FIGS. 6A-6E are schematic diagrams of exemplary regenerative braking operations of the alternatively powered vehicle of FIG. 1. In FIG. 6A, the transmission 16 is in neutral. The engine 12 drives the crank motor 14 to generate storable energy for the battery 34. The biasing motor 20 converts kinetic energy from the front and rear axle assemblies 24, 28 to storable energy for the battery 34. Foundation brakes (not shown) may assist with braking the vehicle 10.

Figure 6B:
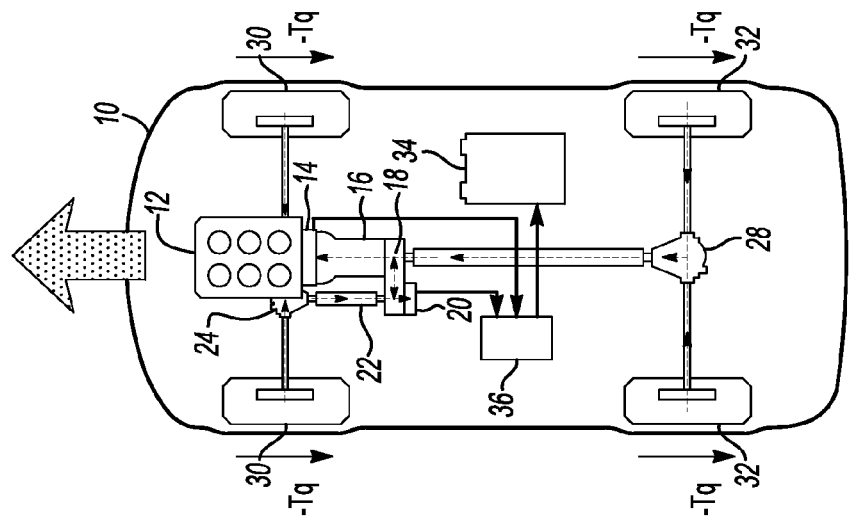

In FIG. 6B, fuel flow to the engine 12 is cut off or reduced to limit output but the transmission 16 remains engaged. The crank motor 14 and biasing motor 20 convert kinetic energy from the front and rear axle assemblies 24, 28 to storable energy for the battery 34. The front/rear brake bias varies according to the contribution of the biasing motor 20 relative to the contribution of the crank motor 14. Foundation brakes (not shown) may assist with braking the vehicle 10.

Figure 6C:
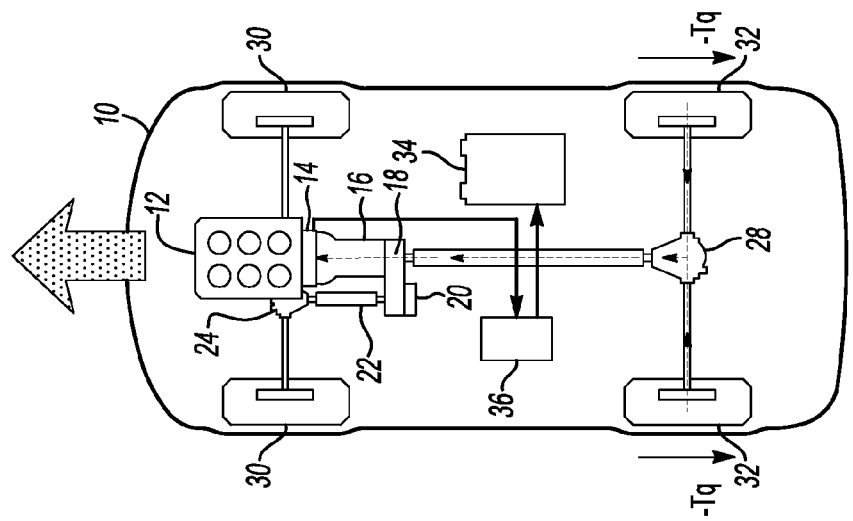

In FIG. 6C, fuel flow to the engine 12 is cut off or reduced but the transmission 16 remains engaged. The crank motor 14 converts kinetic energy from the rear axle 28 to storable energy for the battery 34. Foundation brakes (not shown) may assist with braking the vehicle 10.

Figure 6E:
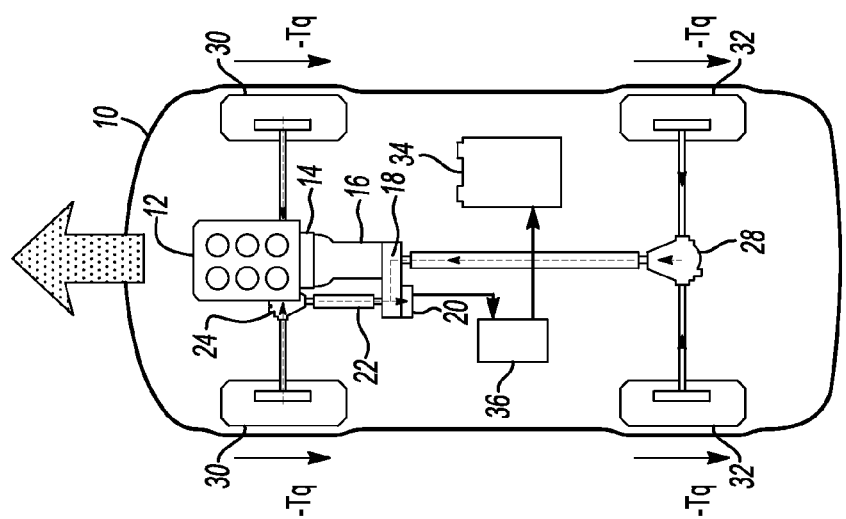
Figure 6D:
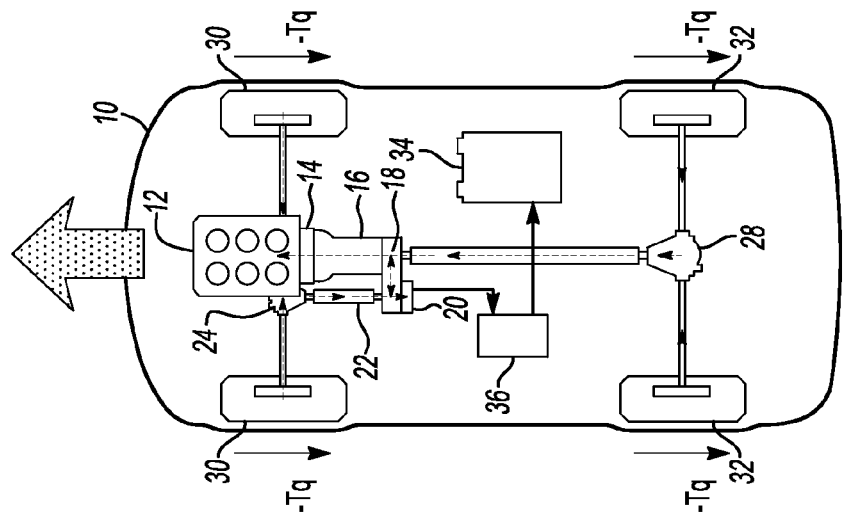

In FIG. 6D, fuel flow to the engine 12 is cut off or reduced but the transmission 16 remains engaged. Engine compression braking assists with retarding the vehicle 10. The biasing motor 20 converts kinetic energy from the front and rear axle assemblies 24, 28 to storable energy for the battery 34. Foundation brakes (not shown) may assist with braking the vehicle 10.

In FIG. 6E, the engine 12 is turned off during braking and the transmission 16 is put in neutral. The biasing motor 20 converts kinetic energy from the primary and secondary axles 24, 28 to storable energy for the battery 34. Foundation brakes (not shown) may assist with braking the vehicle 10.

Figure 7:
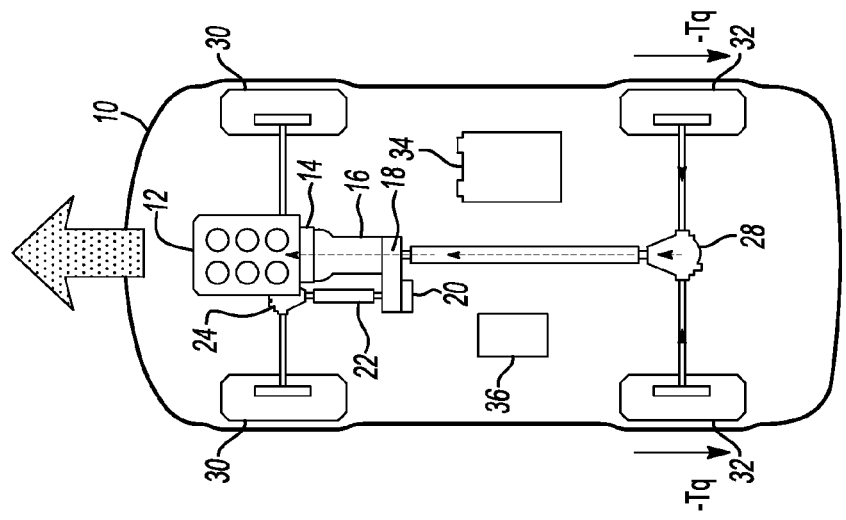
FIG. 7 is a schematic diagram of an exemplary engine braking operation of the alternatively powered vehicle of FIG. 1.

FIG. 7 is a schematic diagram of an exemplary engine braking operation of the alternatively powered vehicle of FIG. 1. Fuel flow to the engine 12 is cut off or reduced to limit engine output but the transmission 16 remains engaged. Engine compression braking retards the vehicle 10. Foundation brakes (not shown) may assist with braking the vehicle 10.

Figure 8A:
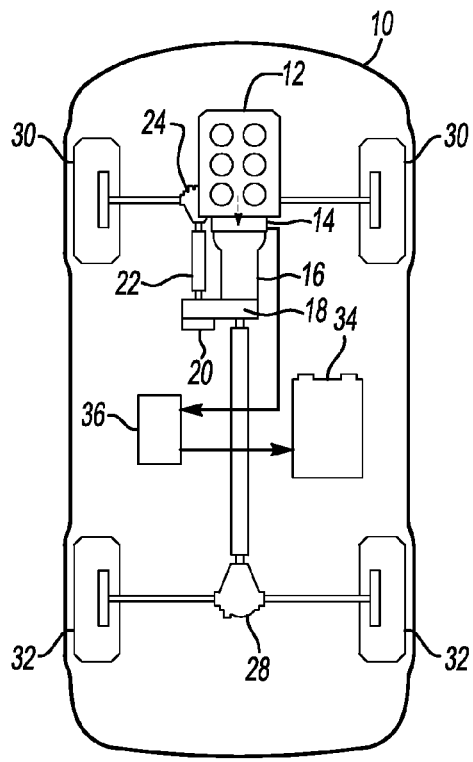
FIGS. 8A-8B are schematic diagrams of exemplary coast/neutral operations of the alternatively powered vehicle of FIG. 1.
Figure 8B:
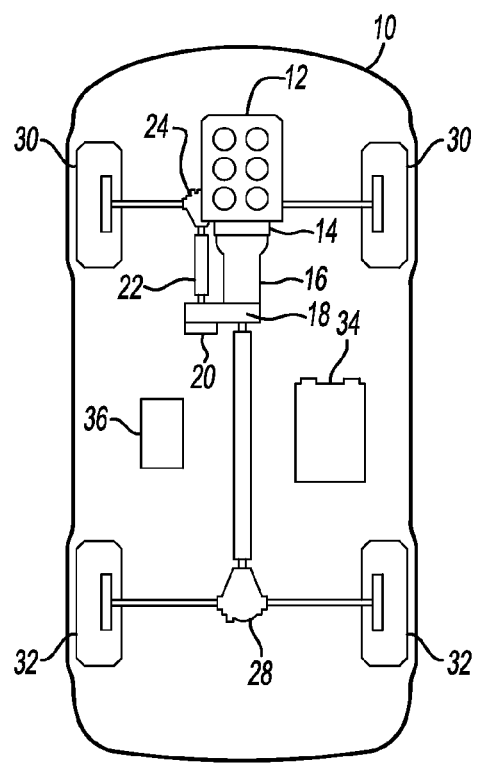

FIGS. 8A-8B are schematic diagrams of exemplary coast/neutral operations of the alternatively powered vehicle of FIG. 1. In FIG. 8A, the transmission 16 is put in neutral. The engine 12 drives the crank motor 14 to generate storable energy for the battery 34. The engine 12, crank motor 14 and biasing motor 20 do not apply retarding torque or propulsion torque to the driveline.

In FIG. 8B, fuel flow to the engine 12 is cut off or reduced to limit engine output and the transmission 16 is put in neutral. The engine 12, crank motor 14 and biasing motor 20 do not apply retarding torque to the driveline.

Figure 9C:
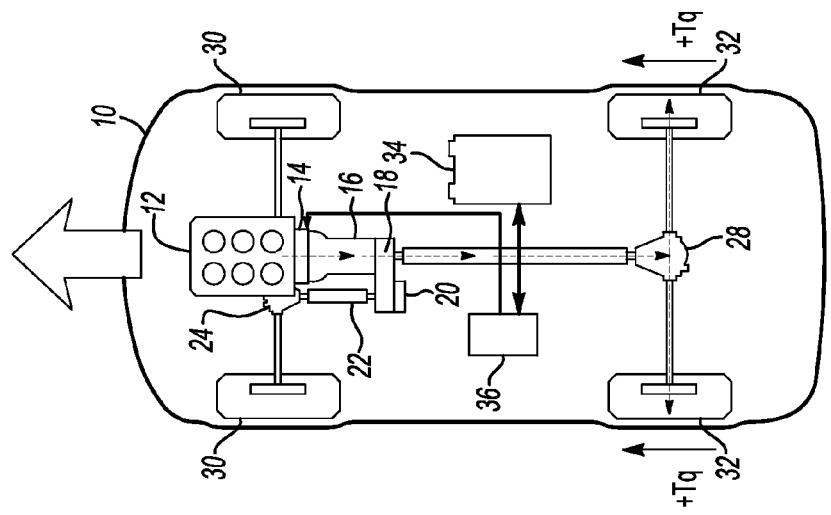
FIGS. 9A-9N are schematic diagrams of exemplary propulsion operations of the alternatively powered vehicle of FIG. 1.
Figure 9B:
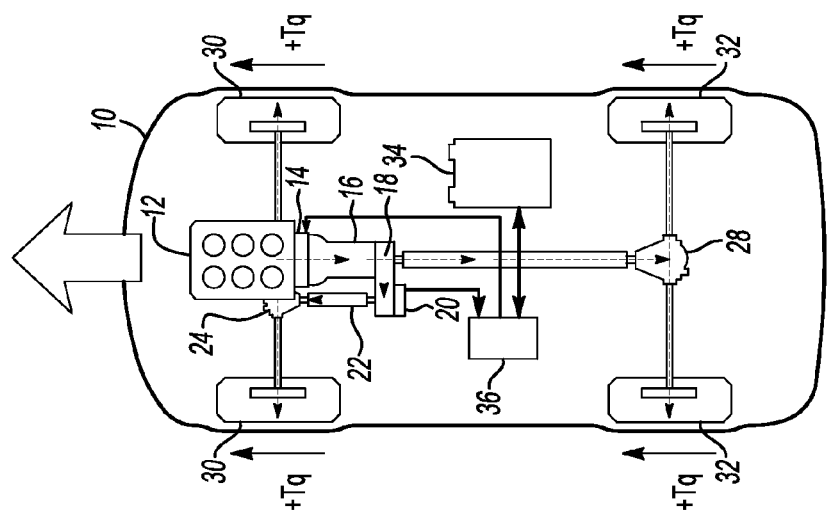
Figure 9A:
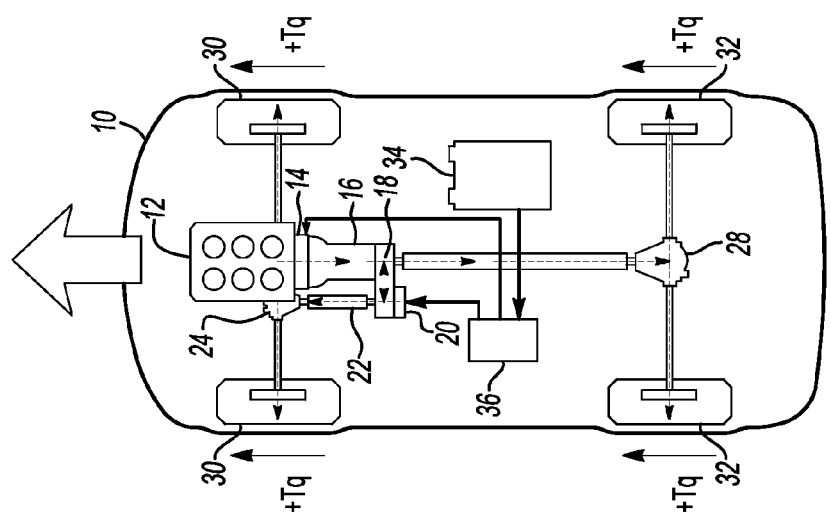
Figure 9I:
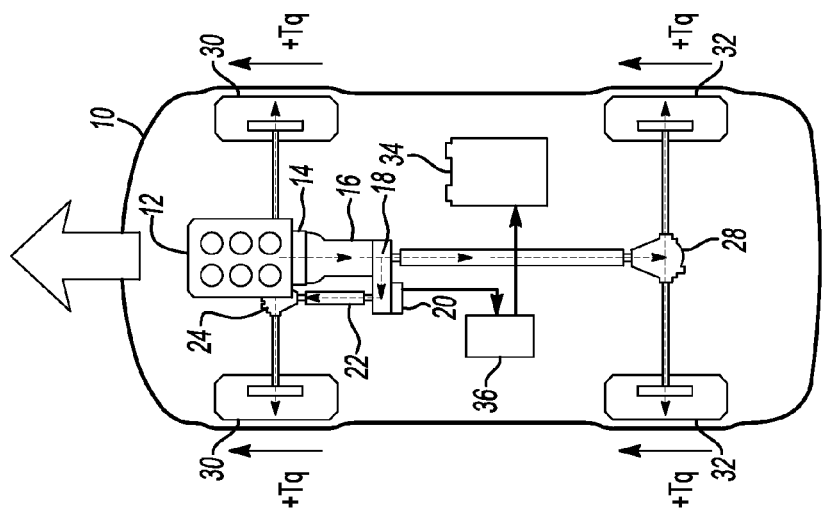
Figure 9H:
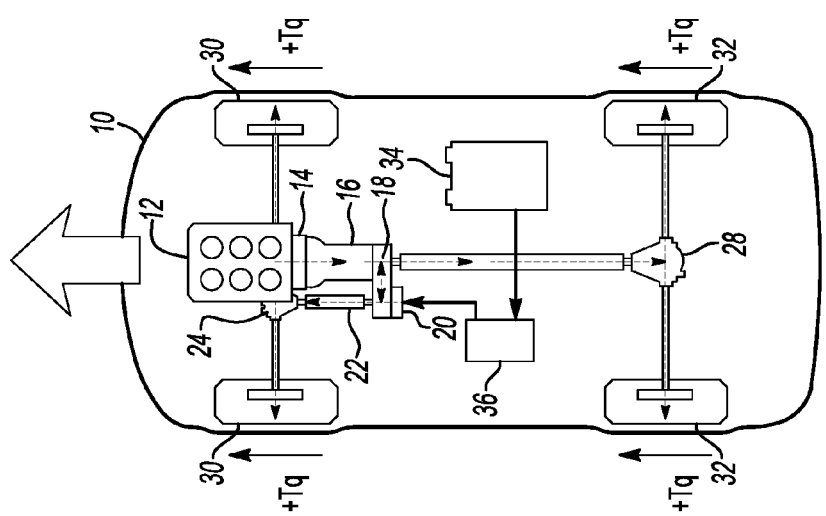
Figure 9G:
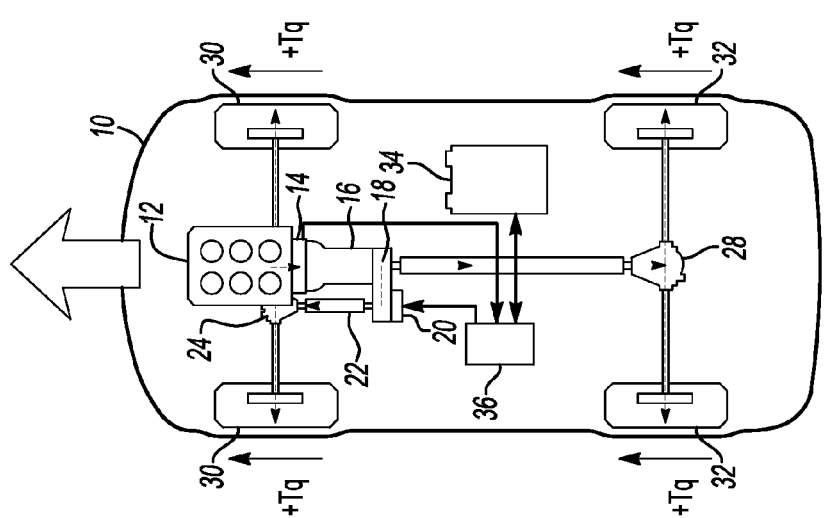
Figure 9L:
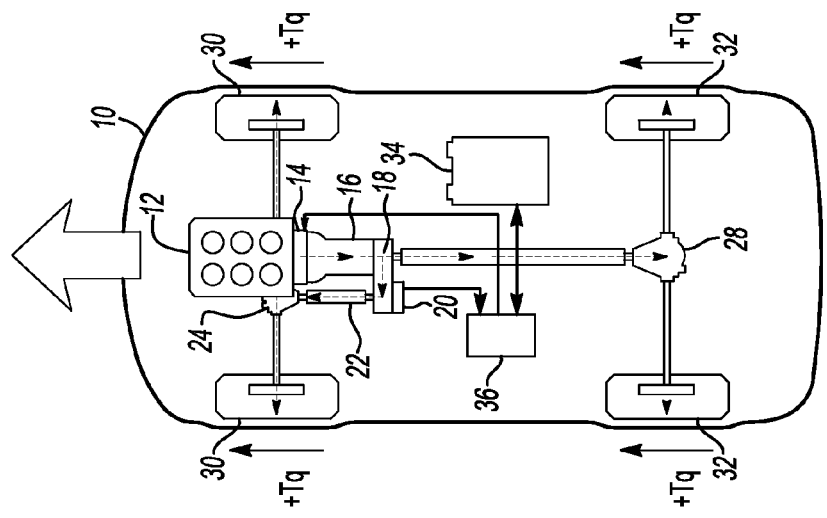
Figure 9K:
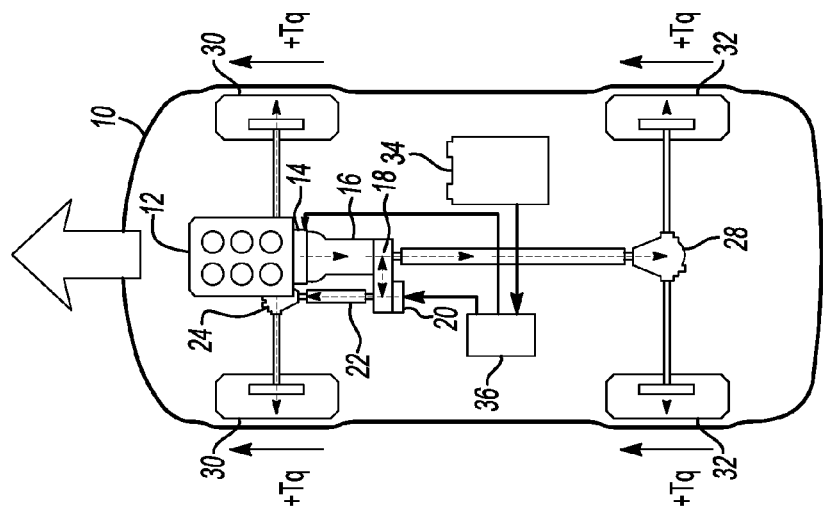
Figure 9J:
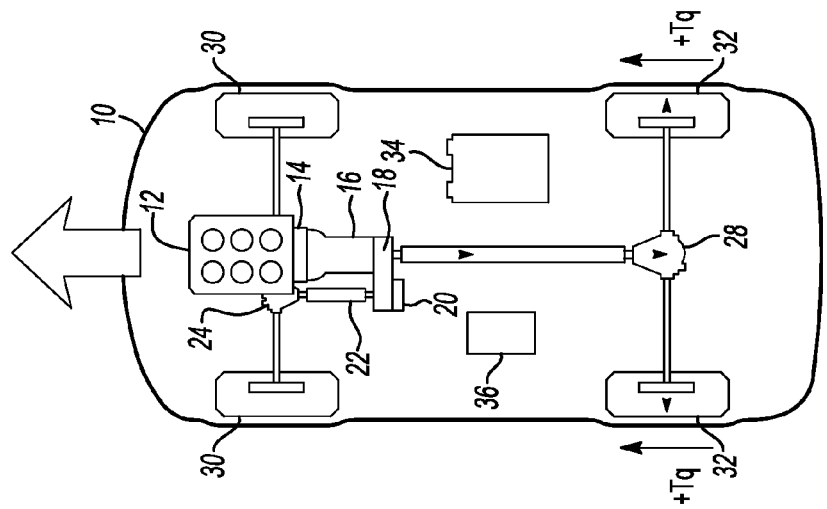
Figure 9N:
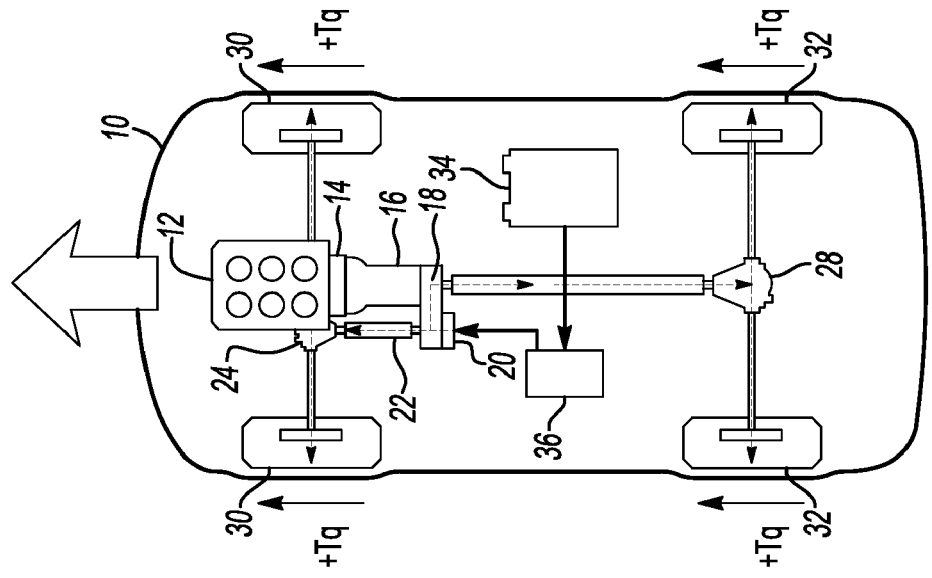

FIGS. 9A-9N are schematic diagrams of exemplary propulsion operations of the alternatively powered vehicle of FIG. 1. In FIG. 9A, the transmission 16 is engaged and the engine 12 and crank motor 14 send torque to the driveline. The biasing motor 20 also sends torque to the driveline. The front/rear torque biasing varies according to the contribution of the biasing motor 20 relative to the engine 12 and crank motor 14. Brake based torque biasing may also be used to bias torque front to rear and side to side.

In FIG. 9B, the transmission 16 is engaged and the engine 12 and crank motor 14 send torque to the driveline. The biasing motor 20, acting as a generator, directs torque from the engine 12 and crank motor 14 to the front axle assembly 24. The front/rear biasing varies according to the reaction torque of the biasing motor 20. Brake based torque biasing may also be used to bias torque front to rear and side to side.

In FIG. 9C, the transmission 16 is engaged and the engine 12 and crank motor 14 send torque to the rear axle assembly 28. The biasing motor 20 is not active. Torque is only delivered to the rear axle assembly 28.

In FIG. 9D, the transmission 16 is engaged and the engine 12 sends torque to the driveline. The crank motor 14 converts some engine torque to storable energy for the battery 34. The biasing motor 20 sends torque to the driveline. The front/rear biasing varies according to the contribution of the biasing motor 20. Brake based torque biasing may also be used to bias torque.

In FIG. 9E, the transmission 16 is engaged and the engine 12 sends torque to the driveline. The crank motor 14 converts some engine torque to storable energy for the battery 34. The biasing motor 20, acting as a generator, directs torque from the engine 12 and crank motor 14 to the front axle assembly 24. The front/rear biasing varies according to the reaction torque of the biasing motor 20. Brake based biasing may also be used.

In FIG. 9F, the transmission 16 is engaged and the engine 12 sends torque to the rear axle assembly 28. The crank motor 14 converts some engine torque to storable energy for the battery 34.

In FIG. 9G, the transmission 16 is put in neutral. The engine 12 drives the crank motor 14 to generate storable energy for the battery 34. The biasing motor 20 drives the first and second axle assemblies 24, 28. Brake based torque biasing may also be used to bias torque front to rear and side to side.

In FIG. 9H, the transmission 16 is engaged and the engine 12 sends torque to the driveline. The crank motor 14 is inactive. The biasing motor 20 also sends torque to the driveline. The front/rear biasing varies according to the contribution of the biasing motor 20. Brake based torque biasing may also be used to bias torque.

In FIG. 9I, the transmission 16 is engaged and the engine 12 sends torque to the driveline. The crank motor 14 is inactive. The biasing motor 20, acting as a generator, directs torque from the engine 12 to the front axle 24. The front/rear biasing varies according to the reaction torque of the biasing motor 20. Brake based torque biasing may also be used to bias torque.

In FIG. 9J, the transmission 16 is engaged and the engine 12 sends torque to the driveline. The crank motor 14 is inactive. The biasing motor 20 is also inactive.

In FIG. 9K, fuel flow to the engine 12 is cut off or reduced to limit engine output but the transmission 16 is engaged. The crank motor 14 sends torque to the driveline. The biasing motor 20 also sends torque to the driveline. The front/rear biasing varies according to the contribution of the biasing motor 20. Brake based torque biasing may also be used to bias torque.

In FIG. 9L, fuel flow to the engine 12 is cut off or reduced to limit engine output but the transmission 16 is engaged. The crank motor 14 sends torque to the driveline. The biasing motor 20, acting as a generator, directs upstream torque to the front axle assembly 24. The front/rear biasing varies according to the reaction torque of the biasing motor 20. Brake based torque biasing may also be used to bias torque.

Figure 9M:
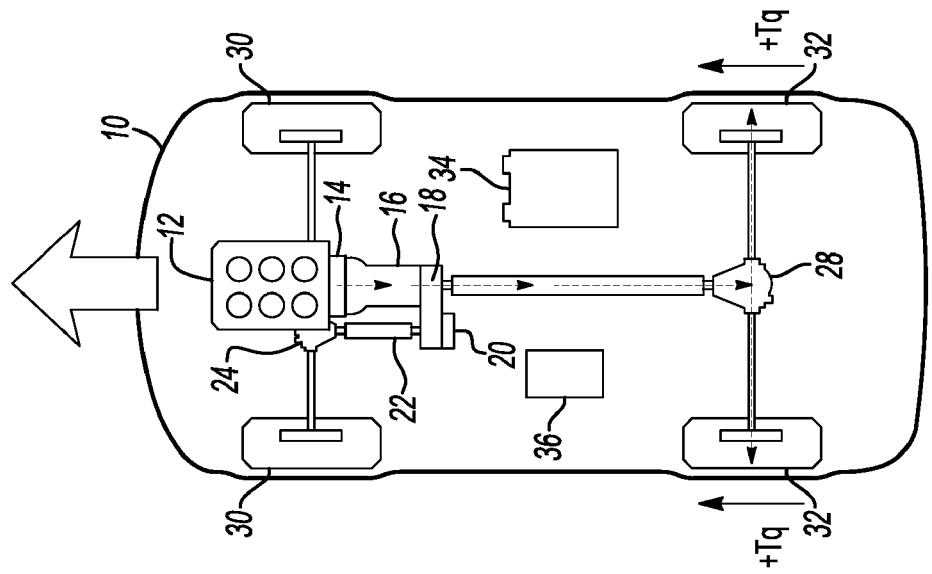
Figures 10A, 10B, 10C, 10D, 10E, 10F, 10G, 10H, 10I, 10J, 10K, 10L:
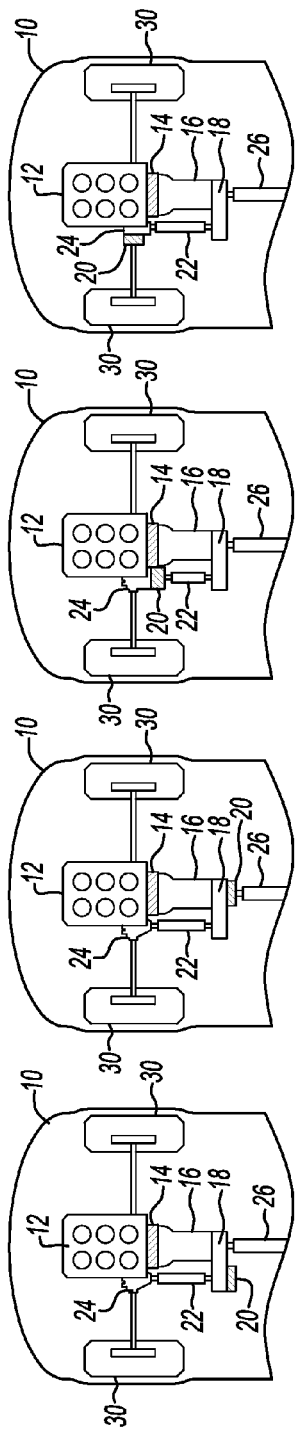
FIGS. 10A-10L are schematic diagrams of exemplary motor locations for alternatively powered vehicles with north-south powertrain configurations.

In FIG. 9M, fuel flow to the engine 12 is cut off or reduced to limit engine output but the transmission 16 is engaged. The crank motor 14 sends torque to the driveline. The biasing motor 20 is inactive. Brake based torque biasing may also be used to bias torque front to rear and side to side.

In FIG. 9N, fuel flow to the engine 12 is cut off and the transmission 16 is put in neutral. The crank motor 14 is inactive. The biasing motor 20 drives the front and rear axle assemblies 24, 28. Brake based torque biasing may also be used to bias torque front to rear and side to side.

The vehicle 110 of FIG. 2 may be operated in a similar fashion as described with reference to FIGS. 5A-9L.

FIGS. 10A-10L are schematic diagrams of exemplary motor locations for alternatively powered vehicles with north-south powertrain configurations. As discussed above, components shown adjacent to one another are mechanically coupled. FIGS. 10E-10H show a clutch 13 which may be used to selectively engage and disengage components from each other. Other configurations not shown are also possible. Additionally, more than one counter motor 14 or biasing motor 20 can be used and placed at various locations within the driveline.

FIGS. 11A-11B are schematic diagrams of exemplary motor locations for alternatively powered vehicles with north-south powertrain configurations. The exemplary locations of the biasing motor 20 in FIGS. 11A-11B may be used in combination with the exemplary locations of the crank motor 14 of FIGS. 10A-10L. Other configurations not shown are also possible. These exemplary motor locations may also be used in vehicles with east-west powertrain configurations.

FIGS. 12A-12C are schematic diagrams of exemplary motor locations for alternatively powered vehicles with east-west powertrain configurations. Other configurations not shown are also possible. Additionally, more than one counter motor 114 or biasing motor 120 can be used and placed at various locations within the driveline.

Figure 13:
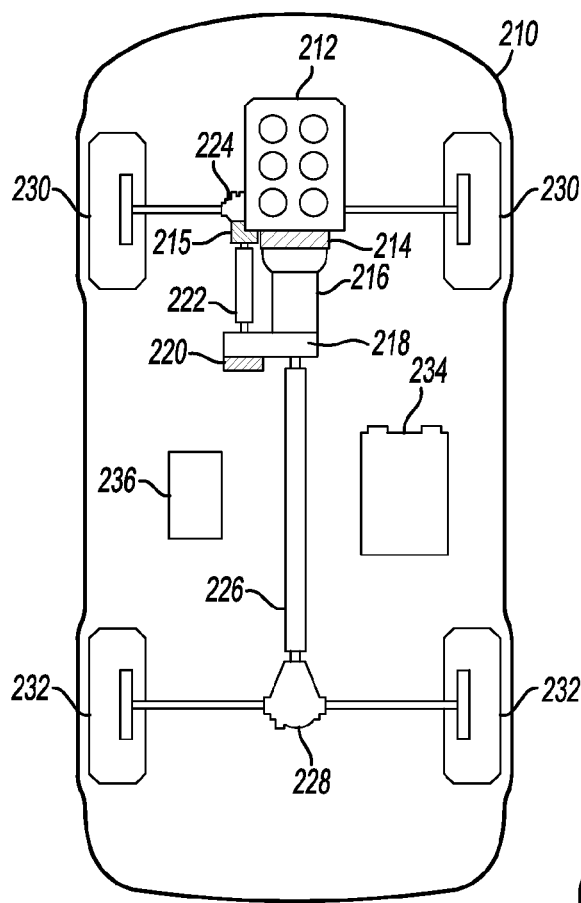
FIG. 13 is schematic diagram of another exemplary alternatively powered vehicle with a north-south powertrain configuration in accordance with certain embodiments of the invention.

FIG. 13 is schematic diagram of an alternatively powered vehicle 210 with a north-south powertrain configuration. The vehicle 210 includes two counter motors 214, 215 and a biasing motor 220. The biasing motor 220 is integrated with a transfer case 218.

In the embodiment of FIG. 13, the counter motor 214 is a crank motor. The counter motor 214 is located between an engine 212 and transmission 216. The counter motor 214 functions as a motor or generator. The counter motor 214 can start the engine 212, provide propulsion power to the driveline, convert power from the engine 212 to electrical power or convert vehicle kinetic energy through the driveline to electrical power.

In the embodiment of FIG. 13, the counter motor 215 is a traction motor. The counter motor is integrated into the front axle assembly 224. The counter motor functions as a motor or generator. The counter motor 215 is used to provide propulsion power to the driveline or convert vehicle kinetic energy through the driveline to electrical power.

The two counter motors 214, 215 may operate for a sustained period without requiring the biasing motor 220 to operate. One of the counter motors 214, 215 may act as a generator while the other may act as a motor, with or without the engine 212 operating. Alternatively, both counter motors 214, 215 may function as motors or generators if the energy storage device 234 has adequate capacity.

Operating the counter motors 214, 215 without the biasing motor 220 allows torque transfer independently to and from front and rear wheel and tire assemblies 230, 232. For example, the counter motor 215 applies torque to the front wheel and tire assemblies 230 while, independently, the engine 212 or/and counter motor 214 applies torque to the rear wheel and tire assemblies 232. Torque management for both propulsion and regenerative braking may thus be optimized.

In alternative embodiments, two or more counter motors may be used. The counter motors may be placed at various locations in the driveline between the engine and the wheels.

Figure 14:
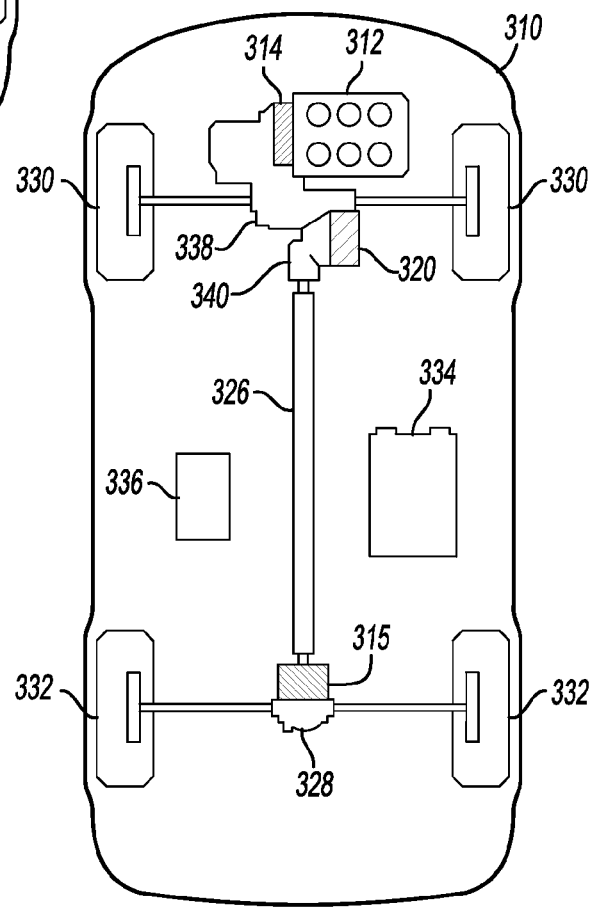
FIG. 14 is a schematic diagram of another exemplary alternatively powered vehicle with an east-west powertrain configuration in accordance with certain embodiments of the invention.

FIG. 14 is a schematic diagram of an alternatively powered vehicle 310 with an east-west powertrain configuration. The vehicle 310 includes two counter motors 314, 315 and a biasing motor 320. The biasing motor 320 is integrated with a power transfer unit 340.

In the embodiment of FIG. 14, the counter motor 314 is a crank motor located between an engine 312 and transmission 316. The counter motor 314 functions as a motor or generator. The counter motor 314 may start the engine, provide propulsion power to the driveline, convert power from the engine 312 to electrical power or convert vehicle kinetic energy through the driveline to electrical power.

In the embodiment of FIG. 14, the counter motor 315 is a traction motor integrated into a rear axle assembly 328. The counter motor 315 functions as a motor or generator. The counter motor 315 is used to provide propulsion power to the driveline or convert vehicle kinetic energy through the driveline to electrical power.

The two counter motors 314, 315 may operate for a sustained period without requiring the biasing motor 320 to operate. One of the counter motors 314, 315 may act as a generator while the other may act as a motor, with or without the engine 312 operating. Alternatively, both counter motors 314, 315 may act as motors or generators if the energy storage device 334 has adequate capacity.

Operating the counter motors 314, 315 without the biasing motor 320 allows torque transfer independently to/from front and rear wheel and tire assemblies 330, 332. For example, the counter motor 315 applies torque to the rear wheel and tire assemblies 332 while, independently, the engine 312 and/or counter motor 314 applies torque to the front wheel and tire assemblies 330. Other variations are also possible. Torque management for both propulsion and regenerative braking may thus be optimized.

In alternative embodiments, two or more counter motors may be used. The counter motors may be placed at various locations in the driveline.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hybrid powertrain system for a vehicle including an energy storage unit, a primary driveline assembly and a secondary driveline assembly, the system comprising:
    a power transfer box for transferring mechanical power between the primary and secondary driveline assemblies;
    a first electric machine configured to selectively
        (i) provide motive power to at least one of the primary driveline assembly and the secondary driveline assembly via the power transfer box by converting electrical power to motive power,
        (ii) receive motive power from at least one of the primary driveline assembly and the secondary driveline assembly by converting motive power to electrical power, and
        (iii) free spin; and
    a second electric machine configured to selectively
        (i) provide motive power to at least one of the primary driveline assembly and the secondary driveline assembly by converting electrical power to motive power,
        (ii) receive motive power from at least one of the primary driveline assembly and the secondary driveline assembly by converting motive power to electrical power, and
        (iii) free spin.

2. The system of claim 1 wherein the vehicle includes an internal combustion engine and wherein the second electric machine is further configured to selectively receive power from the internal combustion engine.

3. The system of claim 1 wherein electrical power generated by one of the first electric machine and the second electric machine is stored in the energy storage unit.

4. The system of claim 1 wherein electrical power generated by the first electric machine is used by the second electric machine.

5. The system of claim 1 wherein energy stored in the energy storage unit is used by the first electric machine or the second electric machine.

6. The system of claim 1 further comprising an epicyclic gear set mechanically connected with the primary and secondary drivelines, the epicyclic gear set being configured to permit differential rotation between the primary and secondary drivelines.

7. The system of claim 1 further comprising an epicyclic gear set including a first element mechanically connected with the first electric machine.

8. The system of claim 7 wherein the epicyclic gear set further includes a second element mechanically connected with the primary driveline assembly.

9. The system of claim 8 wherein the epicyclic gear set further includes a third element mechanically connected with the secondary driveline assembly.

10. The system of claim 1 wherein electrical power generated by the second electric machine is used by the first electric machine.

11. The system of claim 2 wherein the second electric machine is mechanically connected with the internal combustion engine.

12. The system of claim 1 further comprising a transmission wherein the second electric machine is mechanically connected with the transmission.

13. The system of claim 2 further comprising a clutch wherein the second electric machine is selectively mechanically connected with the internal combustion engine via the clutch.

14. The system of claim 1 wherein the second electric machine is mechanically connected with the power transfer box.

15. The system of claim 7 wherein the first electric machine is further configured to selectively apply torque to the first element of the epicyclic gear set.

16. The system of claim 1 wherein the second electric machine is mechanically connected with one of the primary and secondary drivelines.

17. The system of claim 1 further comprising a third electric machine configured to selectively provide motive power to at least one of the primary driveline assembly and the secondary driveline assembly by converting electrical power to motive power, receive motive power from at least one of the primary driveline assembly and the secondary driveline assembly by selectively converting motive power to electrical power, and free spin.

18. A method for operating a hybrid powertrain system for a vehicle including an energy storage unit for storing energy, a primary driveline assembly, a secondary driveline assembly, a power transfer box for transferring mechanical power between the primary and secondary driveline assemblies, a first electric machine and a second electric machine, the method comprising:
    the first electric machine selectively
        (i) providing motive power to at least one of the primary driveline assembly and the secondary driveline assembly by converting electrical power to motive power,
        (ii) receiving motive power from at least one of the primary driveline assembly and the secondary driveline assembly by converting motive power to electrical power, and
        (iii) free spinning; and
    the second electric machine selectively
        (i) providing motive power to at least one of the primary driveline assembly and the secondary driveline assembly by converting electrical power to motive power,
        (ii) receiving motive power from at least one of the primary driveline assembly and the secondary driveline assembly by converting motive power to electrical power, and
        (iii) free spinning.

19. The method of claim 18 wherein the vehicle further includes an internal combustion engine and wherein the second electric machine is further configured to selectively receive power from the internal combustion engine.

20. The method of claim 18 wherein the vehicle further includes a third electric machine, the third electric machine selectively providing motive power to at least one of the primary driveline assembly and the secondary driveline assembly by converting electrical power to motive power, receiving motive power from at least one of the primary driveline assembly and the secondary driveline assembly by selectively converting motive power to electrical power, and free spinning.

* * * * *